(12) United States Patent
Borgonovo dos Santos (10) Patent No.: US 11,572,139 B2
(45) Date of Patent: Feb. 7, 2023

(54) APPARATUS FOR SENSING MOVEMENT OF AN OBJECT RELATIVE TO A FLUID

(71) Applicant: Marcio Borgonovo dos Santos, Leca da Palmeira (PT)

(72) Inventor: Marcio Borgonovo dos Santos, Leca da Palmeira (PT)

(73) Assignee: RIEDEL COMMUNICATIONS INTERNATIONAL GMBH, Wuppertal (DE)

( * ) Notice: Subject to any disclaimer, the term of this patent is extended or adjusted under 35 U.S.C. 154(b) by 0 days.

(21) Appl. No.: 16/555,124

(22) Filed: Aug. 29, 2019

(65) Prior Publication Data

US 2020/0086956 A1    Mar. 19, 2020

(30) Foreign Application Priority Data

Sep. 14, 2018  (DE) .......................... 102018122581.4
Nov. 16, 2018  (EP) ..................................... 18206724

(51) Int. Cl.
  *B63B 32/70*  (2020.01)
  *B63B 49/00*  (2006.01)
  *G01B 7/16*   (2006.01)
  *G01P 5/02*   (2006.01)

(52) U.S. Cl.
  CPC .............. *B63B 32/70* (2020.02); *B63B 49/00* (2013.01); *G01B 7/18* (2013.01); *G01P 5/02* (2013.01)

(58) Field of Classification Search
  CPC ..... B63B 49/00; B63B 32/70; G01P 13/0026; G01P 5/04
  See application file for complete search history.

(56) References Cited

U.S. PATENT DOCUMENTS

| 2,985,014 A |   | 5/1961 | Doersam, Jr. |
| 4,161,118 A | * | 7/1979 | Banwell .............. G01C 13/002 |
|             |   |        | 73/170.15 |
| 4,653,319 A |   | 3/1987 | Parsonage |
| 4,730,485 A | * | 3/1988 | Franklin ................. G01W 1/14 |
|             |   |        | 73/170.15 |

(Continued)

FOREIGN PATENT DOCUMENTS

| DE | 3319684 B | 12/1984 |
| DE |  227329 B |  9/1985 |

(Continued)

*Primary Examiner* — Andrew Polay
(74) *Attorney, Agent, or Firm* — Andrew Wilford (57) ABSTRACT

Disclosed is inter alia an apparatus (63) for sensing a movement of an object (10, 11) relative to a fluid (12, 13), e.g. for sensing relative movements of a surf board in water. A particular characteristic of the invention is that the housing (21) is mounted in fixed arrangement to a surface (20) of the object, the housing receiving a spring member (62) having a plurality of blades (25a, 25b, 25c, 25d), wherein each blade has an outer end (27) which is fixed to the housing, and an inner end (28) which is connecting to a center portion (65) of the spring, the plurality of blades defining a plane (73), wherein a plurality of strain gauges (26a, 26b, 26c, 26d) is positioned on the blades, and wherein a rigid pin (17) is mounted on the center portion of the spring member which is extending in a direction of a normal vector (74) of the plane and which is protruding from the surface (20) of the object and configured to dip into the fluid.

11 Claims, 7 Drawing Sheets

(56) References Cited

U.S. PATENT DOCUMENTS

| | | | | |
|---|---|---|---|---|
| 5,186,050 | A | * | 2/1993 | Lagace ..................... G01P 5/07 |
| | | | | 73/866.5 |
| 5,838,635 | A | * | 11/1998 | Masreliez ............ G10K 11/006 |
| | | | | 73/181 |
| 5,959,209 | A | * | 9/1999 | Takeuchi ................ G01L 5/167 |
| | | | | 73/514.34 |
| 6,213,041 | B1 | | 4/2001 | Kojima |
| 7,166,005 | B2 | | 1/2007 | Tirloni |
| 7,268,691 | B2 | | 9/2007 | Koors et al. |
| 7,737,923 | B2 | | 6/2010 | Shishido |
| 9,927,454 | B2 | * | 3/2018 | Summers ................. G01P 1/026 |
| 2006/0194485 | A1 | | 8/2006 | Tirloni et al. |
| 2009/0042467 | A1 | | 2/2009 | Huang |
| 2014/0020480 | A1 | * | 1/2014 | Schmidt .................... G01P 5/02 |
| | | | | 73/861.71 |

FOREIGN PATENT DOCUMENTS

| | | |
|---|---|---|
| DE | 19718917 B | 5/1999 |
| DE | 202009008655 U1 | 12/2009 |
| JP | 60207063 A | 10/1985 |

\* cited by examiner

APPARATUS FOR SENSING MOVEMENT OF AN OBJECT RELATIVE TO A FLUID

The invention pertains to an apparatus for sensing a movement of an object relative to a fluid. In particular the invention pertains to an apparatus which permits sensing of a movement of an object, which is a water vehicle, like a surf board, a boat, a yacht, a canoe, or any other water vehicle.

The apparatus of the invention also includes submarine applications, such as diving water vehicles.

Further the apparatus according to the invention can be configured to sense movements of objects, such as vehicles, in fluids other that water, for example in air or in gases.

It is important to say that the invention not only serves for sensing a movement of the object in the fluid but also comprises apparatuses for sensing movement of a fluid relative to the water. For example the apparatus according to the invention is capable of sensing movements of fluids, as kerosene or fuel or other combustible, relatively to a fixed container or tank which receives this fluid, for example for monitoring a required mixing of different parts of a fluid.

In nautical applications there have been described different systems and apparatuses to measure movements of an object in the water. For example it is often desirable to obtain speed information or wind information.

It is now referred to some prior art patent documents:

U.S. Pat. No. 7,737,923 B2 discloses a device serves for measuring a fluid flow.

U.S. Pat. No. 7,166,005 B2 discloses a sensor having a spherical lobe.

US 2009/0042467 A1 discloses a speed meter.

DE 197 18 917 C1 discloses a sensor having at least two optical detectors which are detecting air bubbles in the water which is flowing along the two detectors.

U.S. Pat. No. 6,213,041 B1 discloses a speed sensor which comprises of a rotator which includes a plurality of blades. The speed sensor also includes a rotation detector to determine the rotational speed of the rotator.

DE 33 19 684 A1 describes a propeller to be dispensed in water. The rotational speed of the propeller corresponds to the speed of the object in water.

DD 227 329 A1 discloses detecting fluid movement measurements. The sensor proposed by this document shall be provided by heated electric lines.

DE 85 23 456.7 U1 discloses a detection apparatus for speed measurements for water vehicles comprising a magnet and four electrodes.

The prior art apparatuses use various apparatuses and techniques for measuring movements but mostly employ movable parts. This is of disadvantage as movable parts can deter and also can be blocked for any unforeseen reasons.

In view of these prior art apparatuses it is the object of the invention to provide an apparatus for sensing a movement of an object relative to a fluid which is reliable and does not employ movable parts.

The objection is solved by the teaching of claim 1.

According to the invention an apparatus is provided for sensing a movement of an object relative to a fluid. The movement which can be sensed can be a 3-dimension (3D) movement or a 2D-movement.

With the apparatus provided 2D-movements and/or 3D-movements can be sensed. In particular, the apparatus of the invention can provide sensed information which describe a relative movement of the object in the fluid or which permit the information which describe a relative movement of the object in the fluid can be derived from the sensed data.

The movement detected can comprise information about the movement in x-, y- and/or z-direction, where x, y and z are directions in a Cartesian coordinate system.

The apparatus of the invention is configured to be mounted in a fixed relationship to the object, in particular at an outer face or near to an outer face of the object. The apparatus comprises a housing which can be of any appropriate shape.

For example the housing can be mounted in a cavity in the object.

If the object is a water vehicle, the housing will be preferably be mounted at a place on a surface which is—when the water vehicle is used—in contact with the water.

Further preferably the housing is mounted in a flush arrangement to the surface of the object or recessed to the surface of the object, such that the housing will not protrude from the surface.

The housing of the apparatus of the invention is receiving a spring member. The spring member has a plurality of blades, for example three, four or more blades. The blades are made of an appropriate material such as metal or plastic to generate the spring action of the blade.

Each blade has an outer end and an inner end. The outer ends of the blade are connecting to the housing directly or to an intermediate member such as a ring member which can be part of the housing or can be fixed to the housing. The outer end of each blade is—when the apparatus is mounted—in fixed relation to the surface of the object.

The inner ends of the blades are connecting to a center portion of the spring member.

In the center portion of the spring member a rigid pin is mounted or affixed thereto. The pin according to the invention is an elongated member which is configured as a rod or a bolt and has an elongated shape. Preferably, the pin has a cylindrical shape, further preferably having a circular cross section. However other cross sections are also comprised in the teaching of the invention. Further, the pin not necessarily needs to be cylindrical but also may have a shape which is varying along its axis.

The pin of the apparatus according to the invention is rigid. The pin therefore is not elastically.

The plurality of blades defines a plane and/or approximates a plane. The pin is extending in a direction of a normal vector to this plane, so the plane is orientated orthogonal to this plane.

When the apparatus is mounted at the object, the pin is protruding from a surface of the object.

The pin is—according to the invention—configured to dip into the fluid.

When the object is moving relative to the fluid, for example a surf board is moving in the water, according to the speed of the object relative to the water there are forces exerted by the water onto the pin. The pin itself is rigid or stiff and will not change its form, but as one end of the pin is held by the center portion of the spring member and as the water will exert a force onto the free end of the pin, the pin will be slightly pivoted. The pin will pivot only for a very, very small angle, for example less than 1°. The force exerted by the water onto the pin will lead to a force exerted onto the spring member. The pin will act as a force transmitting member. By the forces exerted onto the pin the blades will be slightly deformed.

According to the invention there is a plurality of strain gauges positioned on the blades. By the deformation of the blades—and the strain gauges—the resistance of the strain gauge will change.

The strain gauges are part of an electrical circuit and any change of the resistance of the strain gauge can be detected by the circuit.

By detecting the changes of the resistance or by detecting any electrical or physical measuring value which changes following a change of the resistance of the strain gauges, the force exerted by the fluid onto the pin can be calculated or derived and from the values not only the value of the force exerted on the pin can be measured and/or calculated but also the direction of the force exerted onto the pin can be measured and/or calculated.

According to an advantageous embodiment of the invention there are at least three blades provided, each having a strain gauge. From appropriate positioning the blades ad the strain gauges and by embedding the strain gauges into an electric circuit a measurement of the speed and/or the orientation of the relative forces can be performed.

According to an advantageous embodiment of the invention the plurality of blades comprises at least three blades. This embodiment is providing a sensor with a construction using a minimum number of blades and is requiring a minimum number of strain gauges.

According to a further advantageous embodiment of the invention the blades are arranged angularly equidistant from each other. Between each pair of blades the same angular distance is provided. This provides an apparatus which permits use of known electronic circuit and facilities calculation of the forces applied to the pin.

According to a further advantageous embodiment of the invention the plurality of strain gauges comprises at least three strain gauges positioned on three different blades. This embodiment enables provision of an apparatus using a minimum number of strain gauges.

According to a further advantageous embodiment of the invention the pin supports a floater member. A floater member may be configured as a ring like member or a disk like member and may be positioned on the pin, for example at the free end of the pin. The floater member can detect forces in a direction along the longitudinal axis of the pin. This direction is in this patent application also designated the z-direction.

In measuring these forces exerted onto this pin in that direction, a real 3-dimension (3D) measurement value can be obtained and delivered to a user or to a spectator as further information.

As an alternative of using a floater member, a membrane element or any other pressure sensitive element can be used to detect movements of the pin in z-direction or to detect movements of the object in z-direction in relation to the fluid. This membrane can for example be positioned at the end of the pin, or can be positioned alternatively at the spring member or near to the spring member, in particular inside the housing. The membrane can detect differences in pressure from which a movement of the object in z-direction relative to the fluid can be derived by calculation.

According to a further advantageous embodiment of the invention the housing comprises a cover element, which is mounted in flush arrangement to the surface of the object. This embodiment provides an apparatus which will practically not disturb movement of the object in the fluid as there are—besides the pin—no parts or element of the apparatus protruding from the surface of the object.

According to a further advantageous embodiment of the invention the cover element has a bore having an inner diameter which is larger than the outer diameter of the pin. The cover element therefore with its bore encloses the pin but permits a slight movement of the pin, avoiding any contact between the pin and the cover element to not generate incorrect measurements.

According to a further advantageous embodiment of the invention the spring member is providing a target position for the pin which is reached when no forces act upon the pin. The spring member will permit a pivoting of the pin relative to the housing when forces are exerted by the fluid upon the pin but will re-position the pin into the target position, as soon as the forces exerted onto the pin are lifted.

According to an alternative aspect the invention pertains to an apparatus according to claim 9.

The apparatus of claim 9 is also solving the object of the invention, however using an alternative teaching:

According to the teaching of claim 9 the apparatus has a housing mounted in fixed arrangement relative to the surface of the object, the housing receiving a basis member. The basis member is fixed to the housing.

The basis member comprises a center portion having an elastically pliable pin. A plurality of strain gauges is positioned on the pin. When a force is applied onto the pin, the pin will ply or bend. Bending for small angles is sufficient. Strain gauges are positioned on the pin and will change their resistance when the pin plied. Again, the strain gauges are parts of an electrical circuit, and the change in resistance of the strain gauges due to a plying of the pin can be sensed or detected.

To avoid that the strain gauges are positioned in the fluid the pin can consist of several concentric elements, including one or more hollow pipes. The strain gauges can be positioned on the outer face of an inner pin and an outer pipe, can be configured to be hollow and is put over the inner pin to protect the strain gauges.

According to a further aspect of the invention a system for determining information about a movement of an object relative to a fluid is described in claim 10.

The system comprises an apparatus of any of the preceding claims 1-9 and a first communication unit which is arranged at the object. The first communication unit is connected to the apparatus, either by cable or by wireless connection. The first communication unit can also be arranged within the housing.

The system of claim 10 further comprises a second communication unit, which can receive information from the first communication unit. The information can be transmitted using any kind of electromagnetic waves of any appropriate frequency and wave length using any kind of protocol. Further alternatively acoustical or optical waves can be transmitted for connecting the first communication unit with the second communication unit.

Preferably, radio frequency signals will be transmitted between the first communication unit and the second communication unit.

Further preferably the second communication unit is either installed in a fixed position at the shore—if the object is a water vehicle—or the second communication unit is installed on a boat on the water or at a platform. The second communication unit can for example be positioned near a race circuit for a sail boat race event.

According to a further advantageous embodiment of the invention the system comprises a calculating unit. The calculating unit is configured to calculate from the information received from the first communication unit a velocity of the object and a direction of movement of the object relative to the fluid. If the object is a water vehicle, the velocity of the object and the direction of movement of the object relative to the water can be determined.

If the object is a fuel tank and the fluid is fuel, the movement of the fuel relative to the fixed apparatus and the direction of movement of the fuel relative to the fixed apparatus can be determined.

According to a further advantageous embodiment of the invention the calculating unit is considering GPS-information about the object for calculating a velocity and a direction of movement of the object relative to the fluid.

The term GPS as used within this patent application shall include any global positioning or satellite navigation system, including any appropriate kind of families of satellites, such as GPS, BDS, GLONASS, Galileo or any other satellite system.

Any further advantages can be derived from the dependent claims not cited as well as from the embodiments of the invention shown in the drawings by way of example only.

Numerous embodiments of the invention are shown in the drawings described in the following description of the figures and under reference to the drawings only in an exemplary way.

For the sake of clarity identical parts or parts having identical functions have been designated with the same reference numerals, in part by adding small alphabetic characters, even for different embodiments.

Features, which have been disclosed only in reference to one single embodiment, can—within the frame of the invention—also be provided at any other embodiment of the invention. Such embodiments are also comprised of the invention, even if such embodiments are not disclosed in the drawings.

All features disclosed in the following description are of relevancy for the invention. In the disclosure of this patent application there is also included the disclosure of any cited prior art documents and prior art apparatus, including for the purpose to take up one or several features of those prior apparatuses into one or more claims of the present patent application.

An embodiment of an apparatus according to the invention is designated in its entity in the figures with the reference numeral 63.

The embodiment of the apparatus 63 according to the invention will be referenced to in view of the object 10. The object 10 is schematically shown in the drawings as a surf board 11. This surf board 11 serves to be used in a fluid 12 which in the present case is water.

Figure 1:
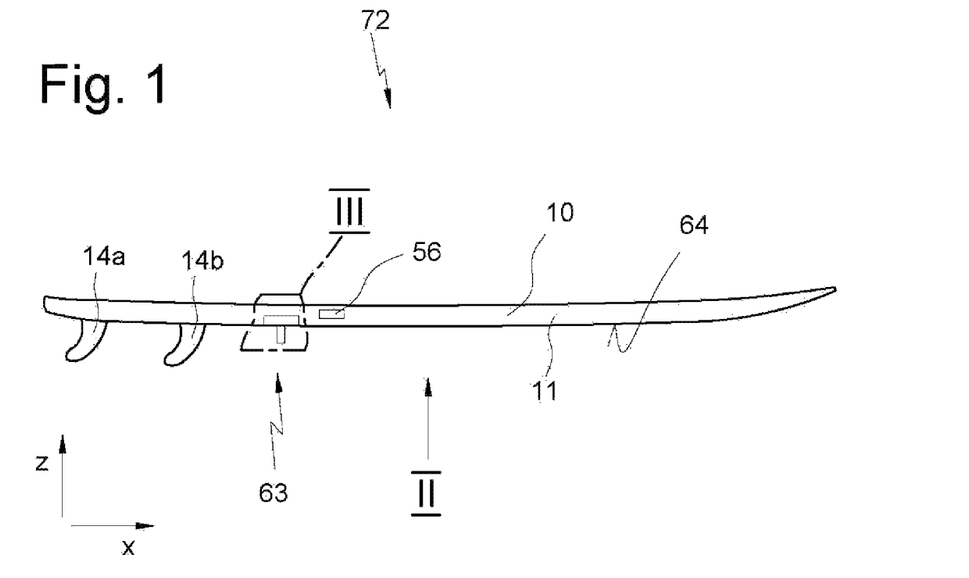
FIG. 1 a first embodiment of the apparatus of the invention incorporated in a surf board which is shown in a schematic side view, FIG. 2 the surf board of FIG. 1 in a schematic bottom view according to arrow II in FIG. 1, FIG. 3 a schematic cross sectional view of the embodiment of the apparatus of FIG. 2 taken along line in FIG. 2, FIG. 4 an embodiment of a 4-blade-sensor element of the apparatus of the invention in a perspective schematic view, FIG. 5 the sensor element of FIG. 4 in a perspective back view according arrow V in FIG. 4 with four strain gauges in exploded view, FIG. 6 a further embodiment of a 4-blade-sensor similar to that of FIG. 4 in a different perspective and showing differently formed blades, FIG. 7 a schematic explosion view of a further embodiment of the apparatus of the invention, FIG. 8 the embodiment of FIG. 7 with numerous parts shown in FIG. 7 subassembled FIG. 9 a schematic perspective view of the embodiment of FIG. 8 in a mounted state, FIG. 10a a schematic cross sectional view of the apparatus of FIG. 4 without floating member in a position where no forces act upon the pin, the pin being in target position, FIG. 10b the apparatus of FIG. 10a in a situation where a first force F is exerted upon the pin, FIGS. 10c-10e the apparatus of FIG. 10a showing further positions of the pin and the blades under action of different forces F acting along different directions onto the pin, FIG. 11 an electric circuit in form of wheatstone bridge in a schematic diagrammatic illustration, embedding the strain gauges, FIG. 12 a further embodiment of the apparatus according to the invention in an illustration similar to FIG. 6 showing a 3-blade sensor having three strain gauges (not shown), FIG. 13 a further embodiment of the apparatus of the invention in schematic illustration similar to FIG. 3 showing a pin which is pliable and having strain gauges mounted on the pin, FIG. 14 a schematic diagram illustrating an embodiment of a system according to the invention comprising an object configured as a water vehicle shown in the water and having a first communication unit, a second communication unit mounted on the shore, and a satellite, FIG. 15 a further embodiment of the apparatus according to the invention in an illustration similar to FIG. 3 showing a membrane for detecting z-directional forces mounted in the pin, and FIG. 16 a further embodiment of apparatus of the invention in an illustration similar to FIG. 3 showing a membrane arranged in the housing, near or at the blades.
Figure 2:
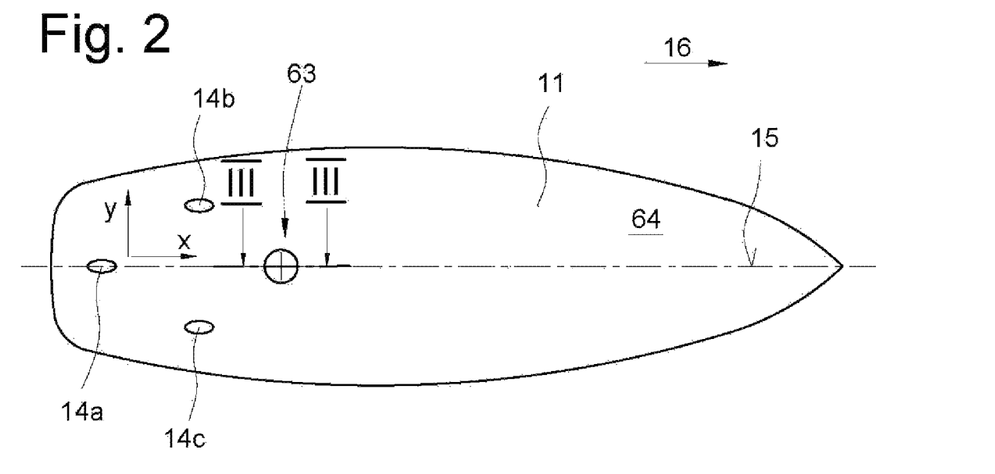

According to FIGS. 1 and 2 the surf board 11 might have a plurality of fins 14a, 14b, 14c.

The middle axis of the surf board 11 is designated with the reference numeral 15 and the direction of travel 16 of the surf board 11 will mostly correspond to the middle axis 15.

The apparatus 63 is arranged at the underside 64 of the surf board 11 and is—as can be seen from FIG. 2—positioned advantageously on or near to the middle axis 15 of the surf board 11.

Figure 3:
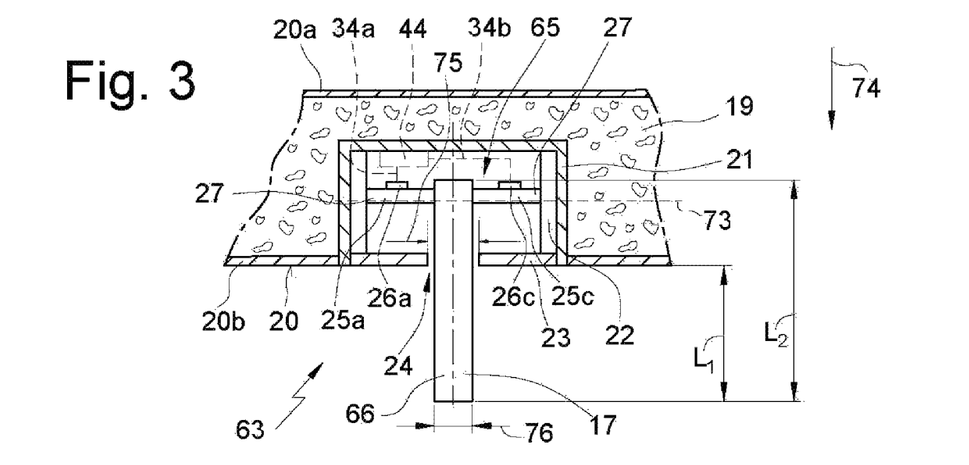
Figure 4:
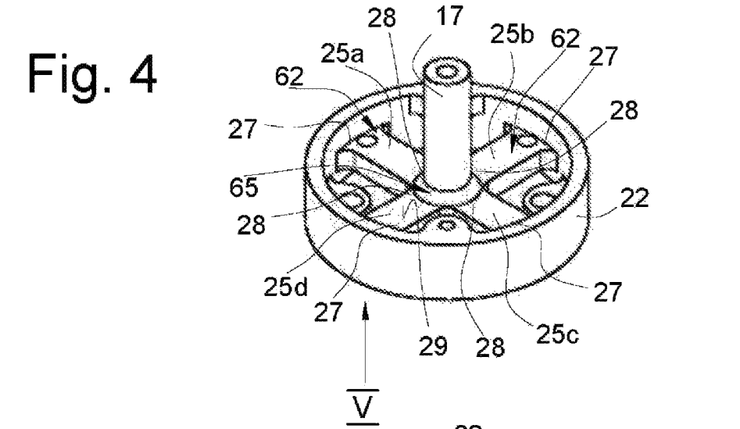

FIG. 3 shows an enlarged schematic cross section view of FIG. 1 according to circle line III.

The apparatus 63 will be now described in detail in view of FIG. 3:

The cross section of FIG. 3 shows the inner structure of the surf board 11 including an inside foam 19 which might be a light weight foam, e.g. made of polyurethane, and hard surfaces 20a, 20b, which may consist of resin and glass fibers. The apparatus 63 comprises a housing 21 which is inserted into the inner structure of the surf board 11 and affixed thereto. The housing 21 receives a ring member 22 which is affixed to the housing 21.

From the inner faces of the ring member 22 there are four blades 25a, 25b, 25c, 25d extending. The outer ends 27 of each blade 25a, 25b, 25c, 25d are affixed to the ring member 22. The inner ends 28 meet in the central hub portion 65. The plurality of blades 25a, 25b, 25c, 25d form a spring member 62 and define a plane 73.

Affixed to a central hub portion 65 of the spring member 62 there is a pin 17.

The pin 17 is cylindrical and has a circular cross section. The pin 17 is extending in a direction orthogonal to the plane 73, which is the direction of a normal vector 74.

The pin 17 consists of a stiff, rigid material, as metal or hard plastics, and does not ply when forces are exerted on the pin.

Figure 10A:
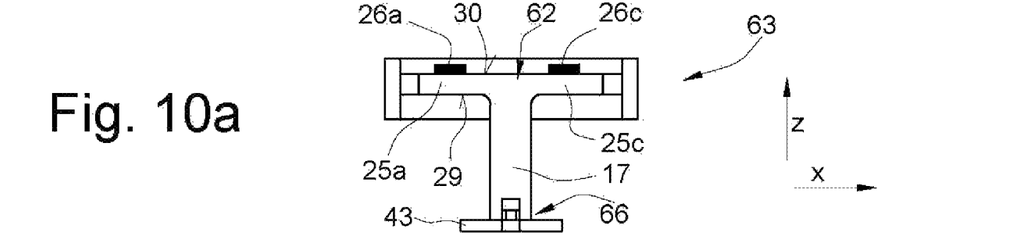

FIG. 10a shows a target position of the pin 17. The spring member 62 is biasing the pin 17 into its target position.

Figure 10B:
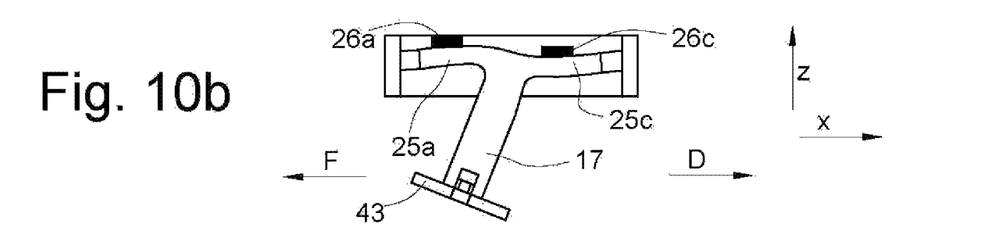

If onto the free end 66 of the pin 17 a force F is exerted (see FIG. 10b) then the pin 17 will pivot from the position according to FIG. 10a into the position according to FIG. 10b.

While the pin 17 is rigid and stiff and will not bend, the blades 25a, 25c will bend as can be seen in comparison of FIGS. 10a and 10b.

According to FIG. 3 the housing 21 of the apparatus advantageously is closed by a cover member 23. The cover member 23 has a bore 24 through which a pin 17 is extending.

Figure 10C:
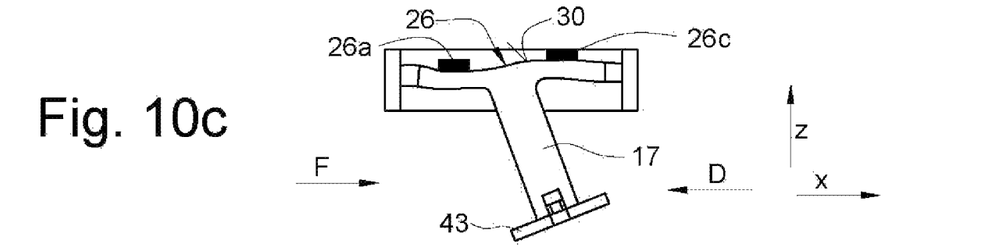

As can be seen in FIG. 3, there is an annular space 67 provided between the bore 24 and the pin 17 to allow movements of the pin 17 as shown in FIGS. 10a to 10c. For the sake of clarity it is noted that the bore 24 has an inner diameter 75 which is larger than the outer diameter 76 of the pin 17.

It shall be noted that the movements shown in FIGS. 10b and 10c are for purpose of illustration only and that in real applications only very small angles, for example of much less than one degree, will be reached.

Figure 5:
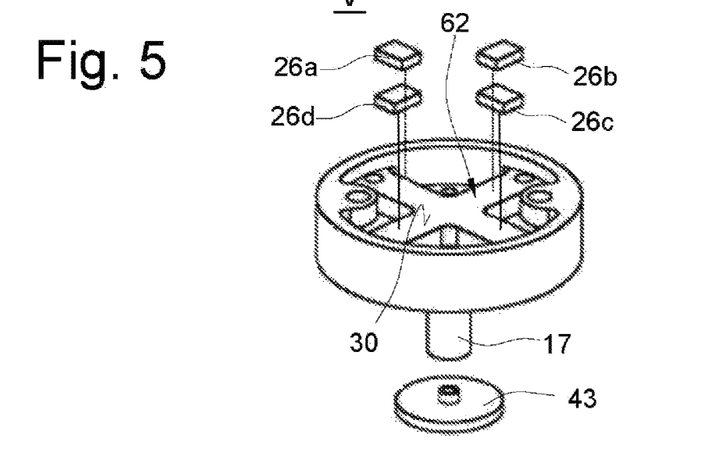

According to FIG. 5, which is an exploded view, there are four strain gauges 26a, 26b, 26c, 26d provided on the back face 30 of the blades 25a, 25b, 25c, 25d. Other embodiments of the invention which are not shown in the drawings provide strain gauges on the front side 29 of the blades 25a, 25b, 25c, 25d. All embodiments shown in the drawings only show strain gauges 26a, 26b, 26c arranged on the back side 30 of the blades 25a, 25b, 25c, 25d.

Strain gauges which can be employed in the embodiments of the invention are standard known electronic elements.

Strain gauges appropriate for use with the invention are commercially available for example at Hottinger Baldwin Messtechnik GmbH in 64293 Darmstadt, Germany.

According to the invention strain gauges 26a, 26b, 26c are glued to the backside 30 of the blades 25a, 25b, 25c and then covered with an insulating material like silicone or resin. The strain gauges 26a, 26b, 26c connected are via cables 34a, 34b (see FIG. 3) connected to other electronic elements and/or are part of an electric circuit 44 which will be explained later under reference to FIG. 11.

Strain gauges 26a, 26b, 26c employed according to the embodiment of the invention are preferably linear strain gauges.

Strain gauges which can be used within the invention change their electrical resistance if the blades 25a, 25b, 25c, 25d, on which the strain gauges 26a, 26b, 26c, 26d are glued to, undergo a change in length.

As can bee seen in comparison of FIGS. 10a and 10b the portion of the back side 30 of blade 25a will be elongated when the pin 17 is pivoted from the position of FIG. 10a in the position of FIG. 10b, while the length of portion of the back side 30 of the blade 25c will be reduced at the same time.

This length discrepancy will lead to discrepancy in the resistance of the strain gauges 26a, 26c.

According to the embodiments of FIG. 3 to FIG. 10e the two strain gauges 26a and 26c are positioned on two blades 25a, 25c, which are arranged exactly opposite to each other. Any change in resistance of strain gauge 26a therefore will be the same at the opposing strain gauge 26c, however with a negative effect.

Using an appropriate electrical circuit, these changes in resistance of the strain gauges 26a, 26b, 26c, 26d can be measured and can be used to obtain information about forces F being exerted on the pin 17.

If for example according to FIG. 10b a force F is exerted onto the pin 17 this will lead to a certain movement of the pin 17 which will result in a certain change in the electric resistances of the two strain gauges 26a, 26c.

If however a contrary force F according to FIG. 10c is exerted onto the pin 17 as shown in FIG. 10c—in the opposite direction compared to FIG. 10b—, then a different behavior of the deviation of the resistances of the strain gauges 26a, 26c will be detected.

The detection of the changes in resistance of the strain gauges 26a, 26b, 26c, 26d can be employed to derive information about the force F exerted onto the pin 17. From the information about the strength of the force F and from the direction of the force F information about the current direction D of the object 10 relative to the fluid 12 and of the velocity of the object 10 relative to the fluid 12 can be calculated.

According to the FIGS. 10a to 10c is has been shown that by detection of the change of resistance of the strain gauges 26a and 26c an information about the force F acting in x-direction can be employed, or an information about the part of the force F acting in x-direction can be employed. It is also possible by using the strain gauges 26b and 26d to obtain information about the strength of the forces F acting in y-direction.

A detection of the differences in the resistance of the strain gauges 26b, 26d can be used to derive information about the direction and the force F which have been exerted onto the pin 17 in y-direction.

According to FIGS. 1 and 2 the direction of travel 16 of the surf board 11 is designated with an X, the direction transverse thereto is designated Y and the vertical direction is designated Z.

It shall be assumed that the strain gauges 26a, 26c of the apparatus 63 shown in FIG. 10a are positioned in such a way at the surf board 11 that they are arranged along a line which corresponds to the direction X. If the surf board 11 would be moving exactly in the direction of travel 16 through the water 13, then the force F according to FIG. 10b would be exerted onto the pin 17.

If however the surf board 11 would—for whatever reason—make a reverse movement in direction -X, the force F as shown in FIG. 10c would be exerted onto the pin 17 and a reverse change of resistance of the strain gauges 26a, 26c would be sensed.

The same applies for strain gauges 26b and 26d, which under the previous assumption, would be orientated in this embodiment in the direction Y, which is transverse to the direction X.

Also the changes of resistance of the strain gauges 26b, 26d are detected through the electric circuit 44.

From the measurements it can not only be derived an information about the relative speed of the object 10 relative to the fluid 12, but also information about the direction of the speed—thus indicating the direction of the object.

Figure 10D:
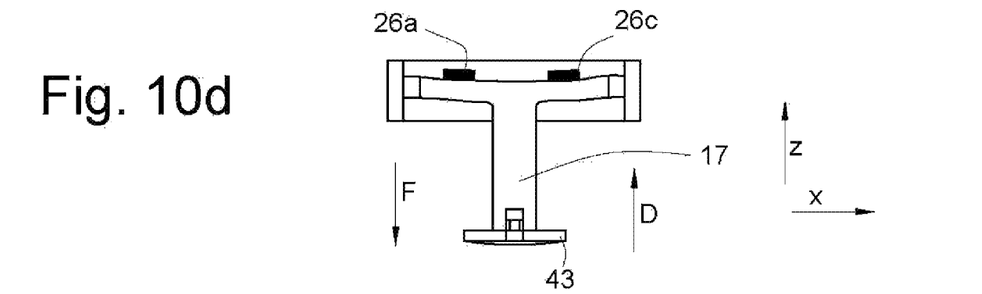
Figure 10E:
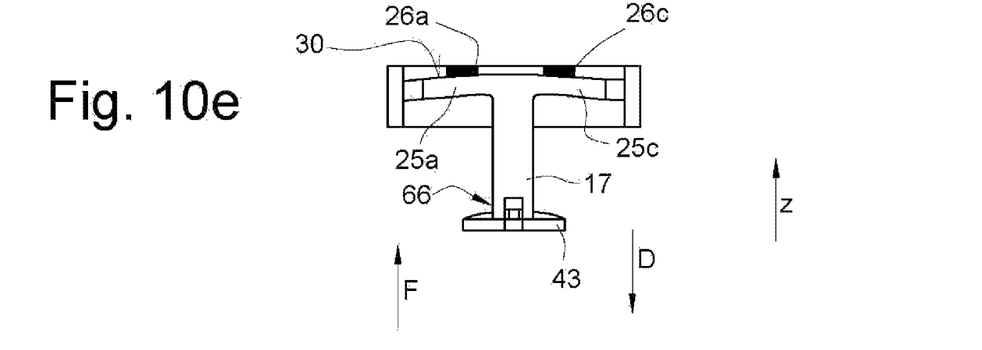

Regarding FIGS. 10d and 10e it is pointed out to the following:

Some embodiments of the apparatus 63 of the invention might include a floating member 43, which is schematically shown in the embodiments of FIGS. 5, 10b to 10e.

This floating member 43 can for example be disk shaped and can be used to measure the buoyancy of the object 10 relative to the fluid 12 The disk shaped floating member 43 can for example be arranged at the free end 66 of the pin 17.

If onto the floating member 43 a force F is exerted in the direction z or in direction −z as shown in FIG. 10*d*, then ongoing from the state of the apparatus 63 as shown in FIG. 10*a* the pin 17 is drawn downward which will lead to a change in resistance of both strain gauges 26*a*, 26*c* commonly.

The same applies analogously if a force F would be exerted to the floating member 43 according to FIG. 10*e* in upward direction (Z-direction) which will lead to an enlargement of the portion of the back face 30 of the blades 25*a*, 25*c* again resulting in a change in resistance of the strain gauges 26*a*, 26*c* commonly.

While it is clear, that the change in resistance of strain gauge 26*a* and strain gauge 26*c* according to FIG. 10*d* will be same or will approximately be the same, it is also clear, that the same effect will take place in a position as shown in FIG. 10*e*, however with a negative i.e. inverse way.

Therefore, a measurement of the change of resistance of the strain gauges 26, 26*c* can also give information about whether or not a force F is exerting onto the pin 17 in z-direction or in −z-direction and also information about the amount of the force F in z-direction.

Figure 11:
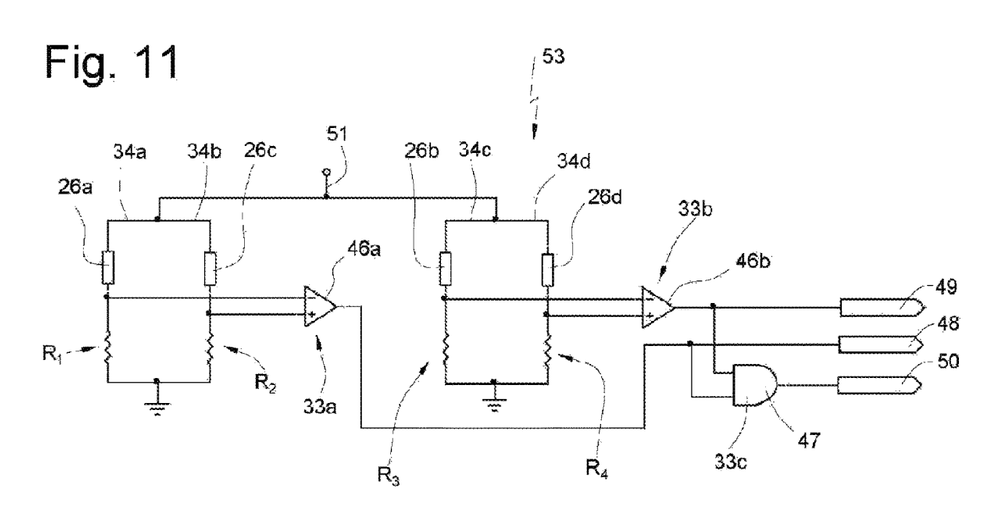

Therefore, an appropriate electronic circuit 44 as shown in FIG. 11 can differ between movements of the pin 17 relative to the spring member 62 in all three different directions x, y and z. This will permit receiving vector information about the direction and the length of the force vector of the force F which is applied to the pin 17.

For clarification it is pointed out to the fact that all embodiments shown may include a floating member 43 or may not include such floating member 43.

All embodiments of the invention as shown in the drawings can also operate without a floating member 43 and still permit to the user to obtain information about the forces F in x- and y-direction.

In many applications there will be no need for obtaining information about z-directional forces F. So such a floating member 43 can be omitted for such applications.

For further explication it is noted that the length L1 of the pin 17 and the length L2 of the pin 17 protruding from the surface 20 of the object may differ in dependency of the different conditions:

It is important for the invention that the free end 66 of the pin 17 is reaching a zone in the fluid 12 which is called the "free layer zone".

Between the free layer zone and the surface 20 there might be a turbulent zone of fluid 12 which might lead to incorrect measuring and values and results.

A turbulent zone of fluid 12 might be part of the fluid which is in movement due to the movement of the object and measurements within this turbulent zone of fluid might not be representative and might result in incorrect measurement values.

All strain gauges 26*a*, 26*b*, 26*c*, 26*e* are connected via cables 34*a*, 34*b* to further electronic components of an electronic circuit.

The circuit 44 is shown in detail by exemplary way only in FIG. 11. The electronic circuit may include one or more electronic elements 33*a*, 33*b* and/or one or more microprocessor (not shown).

According to FIG. 11 there is a power supply/voltage source 51 provided and connected to all strain gauges 26*a*, 26*b*, 26*c*, 26*d* which are in the circuit diagram symbolized by resistances.

The strain gauges 26*a* and 26*b* are arranged in parallel and the strain gauges 26*b* and 26*d* are arranged in parallel.

Further resistances R1, R2, R3 and R4 are provided.

The output voltage at the strain gauges 26*a*, 26*c*—which is an indication for the resistance of the strain gauges or for the change of resistance of the strain gauges—is connected to the input side of a first differential amplifier 46*a*.

The output of this first differential amplifier 46*a* is providing the first output signal 48, which gives an x-direction signal.

The strain gauges 26*b* and 26*c* are in their output connected to the input of a second differential amplifier 46*b* which's output corresponds to the output 49 (signal output) which is a output for the y-direction signal.

The output of the first differential amplifier 46*a* and the output of the second differential amplifier 46*b* is connected to the input of a summing amplifier 47, the output thereof is the output signal 50 corresponding to the signal in z-direction.

The circuit 44 as shown in FIG. 11 in total is a so called wheatstone bridge. This circuit provides a very advantageous way to measure changes in resistances in the strain gauges 26*a*, 26*b*, 26*c*, 26*d* to obtain information about the strength of the force F exerted onto the pin 17 and information about the direction of the force F exerted onto the pin 17.

The measurement values obtained at the signal output 48, 49 and 50 of the three direction x, y and z can be processed using appropriate formulas and can be calculated into force information and directional information. From this information about the speed and the direction of speed of the object relative to the fluid can be calculated.

Appropriate algorithms and formulas can be employed for performing this calculation and for employing the desired information.

Figure 6:
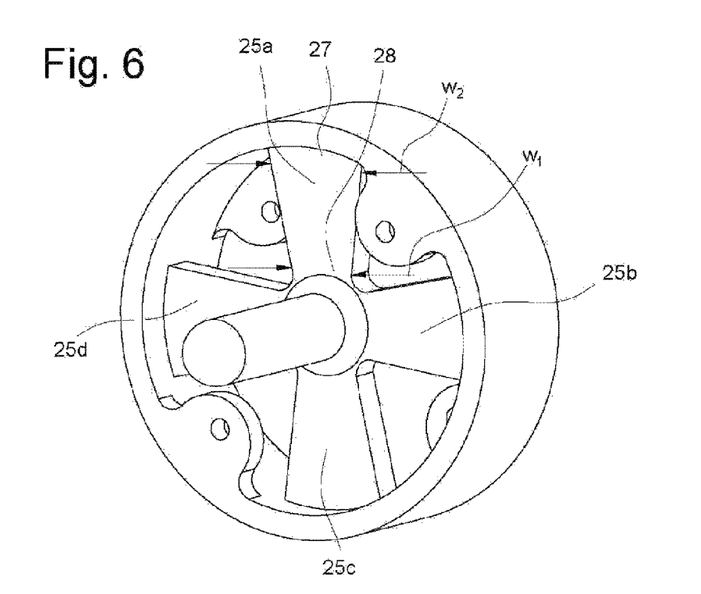

According to FIGS. 6-9 a further embodiment of the apparatus 63 is shown having blades 25*a*, 25*b*, 25*c*, 25*d* which are of different shape:

FIG. 6 shows blades 25*a*, 25*b*, 25*c*, 25*d* which have at its inner end 28 a width W1 which is smaller than the width W2 of the blade 25 at its outer end 28.

Figure 7:
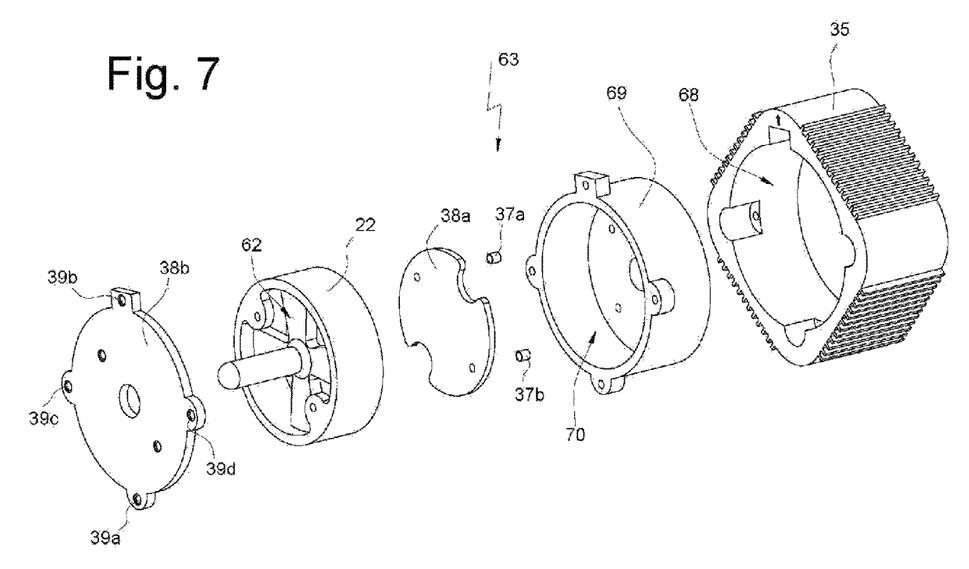
Figure 8:
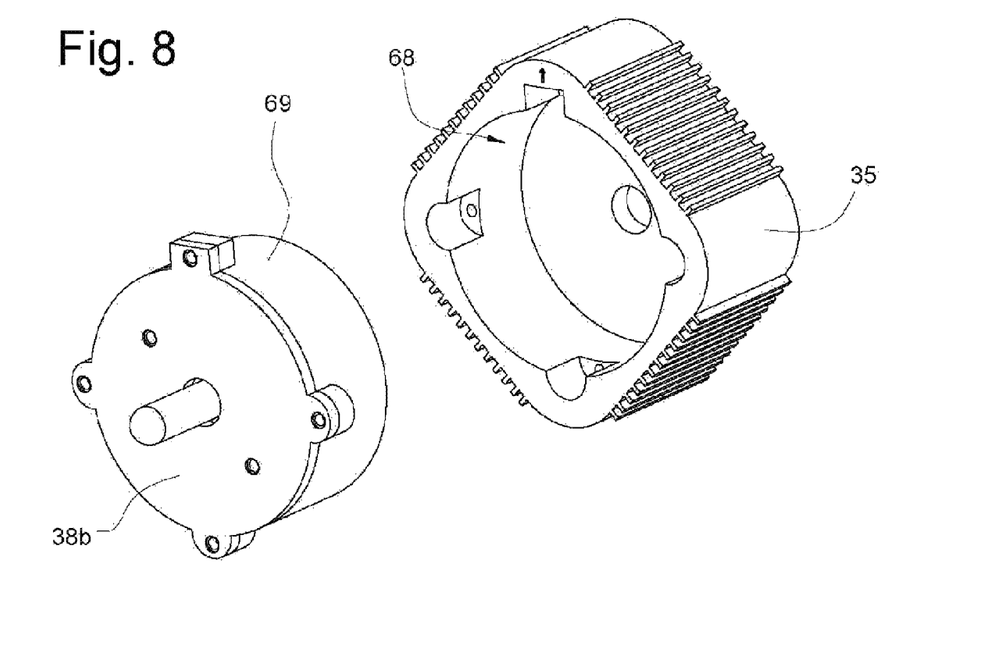
Figure 9:
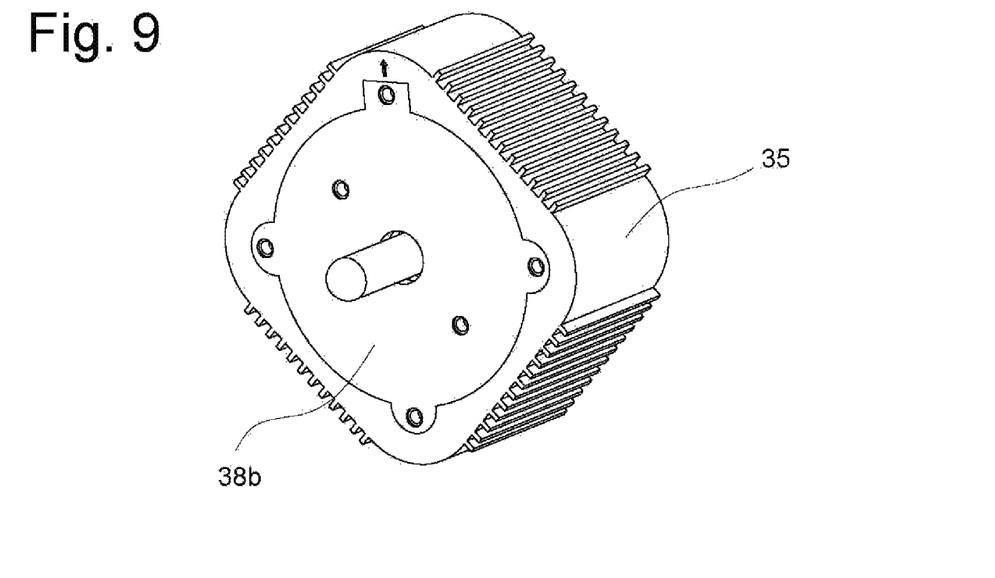

According to FIGS. 7-9 the apparatus 63 can comprise an installation housing 35 which permits pre-installation into the object 10, for example into the surf board 11. The installation housing 35 can comprise a compartment for receiving a sensor housing 69. The sensor housing 69 can also have a compartment 70 for receiving the ring member 22 including the spring member 62.

A plate member 38*b* can close the sensor housing 39 and can constitute the cover member 23 or can be covered by a further cover member not shown in the drawings.

There is a further plate member 38*a* shown for easy installation as well as fixing members 37*a*, 37*b* which facilitate mounting of the sensor.

Screw receptacles 39*a*, 39*b*, 39*c*, 39*d* serve for receiving screws (not shown) for mounting of the apparatus.

Figure 12:
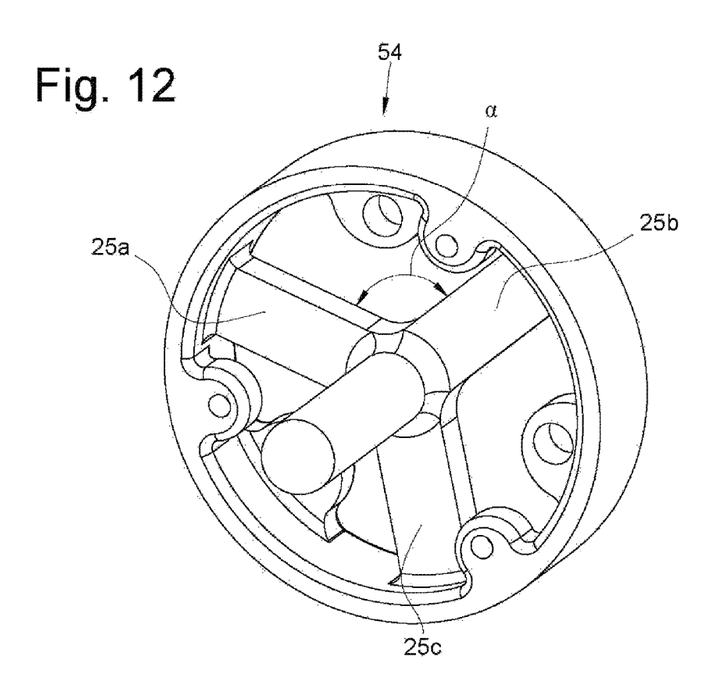

According to the embodiment of FIG. 12 there is 3-blade-sensor 54 shown. This sensor consists of three blades 25*a*, 25*b*, 25*c*, which are arranged under an angular distance of =120°.

On the back side of the blades 25*a*, 25*b*, 25*c* (not shown in FIG. 12) there are in total three strain gauges arranged.

Figure 13:
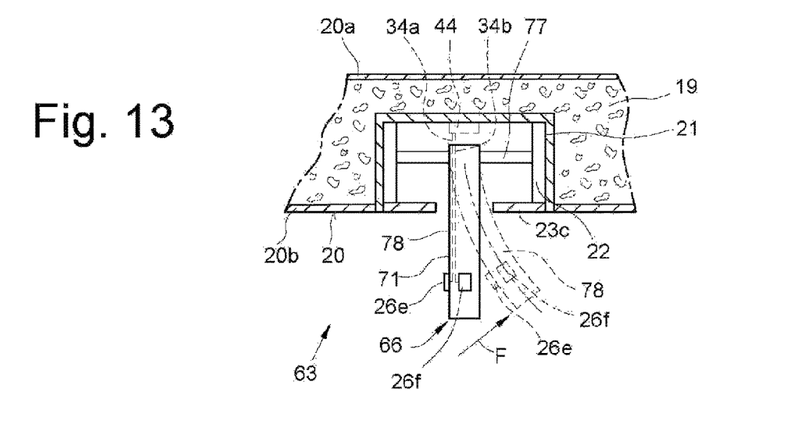

FIG. 13 discloses another embodiment showing an apparatus 63 having a pin 78 which is elastical or pliable. In solid lines the target position of the pin 78 is shown and in a dashed line the bend position of the pin 78 is shown which is reached if a force F is exerted onto the free end 66 of the pin 78.

Strain gauges 26*e*, 26*f* are indicated in FIG. 13 and provided on the outer sides 71 of the pin 78 which are capable of detecting a length change of the pin 78 due to a bending form change of the pin 78.

As there are several strain gauges 26e, 26f arranged at the outer side 71 of the pin 78 the apparatus 63 of FIG. 13 can also not only measure the velocity but also the direction of the velocity.

Figure 14:
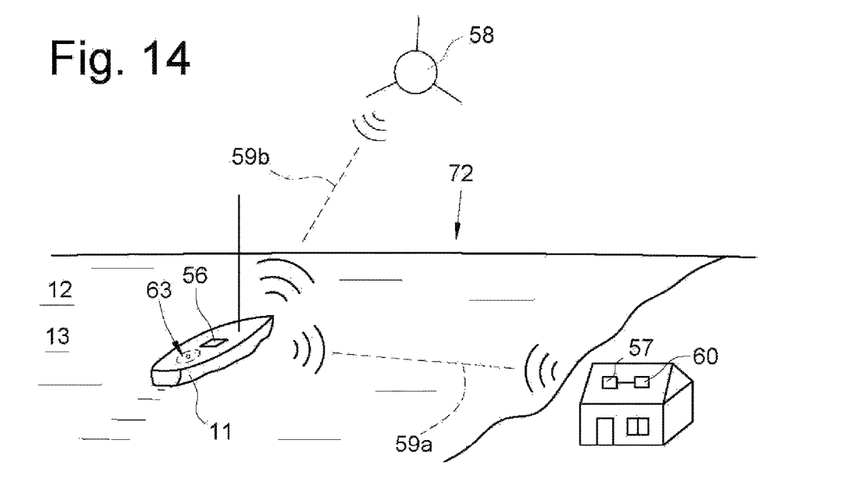

According to FIG. 1 and FIG. 14 there is also a system 72 provided which comprises not only of the apparatus 63 but also of a first communication unit 56. The first communication unit 56 can be an integral part of the apparatus 63 or can be a separate part arranged at the object 10 and being connected to the apparatus 63 either by cable or via wireless connection.

The first communication unit 56 can interact via a signal path 59a in a wireless manner with a second communication unit 57 arranged at a distant place. The second communication unit 57 can be arranged on land, or alternatively on a platform on the sea or on another moving object.

All measurement information obtained from the electronic circuit 44 can be transmitted via the first communication 56 to the second communication unit 57.

According to a further embodiment of the invention it is also possible to include GPS data.

FIG. 14 discloses a system 72 which may also comprise a satellite 58 which is via a signal path 59b—which can be uni-directional—capable of transmitting GPS data to the first communication unit 56. These GPS data can be used or employed or transmitted by the first communication unit 56 to the second communication unit 57.

The second communication unit 57 can be connected to a calculating unit 60 which can calculate all data obtained. From the data received by the calculating unit 60 information about the relative movement of the object 10 relative to the fluid 12 in x-, y- and/or z-direction can be obtained.

For purpose of clarification it shall be noted that the calculation unit 60 can also be installed at the object 10, and can also be integral part of the apparatus 63 or a separate part of the apparatus 63.

While the previous embodiments employ—in part—a floating member 43, instead of such a floating member a membrane 61 can be used.

Figure 15:
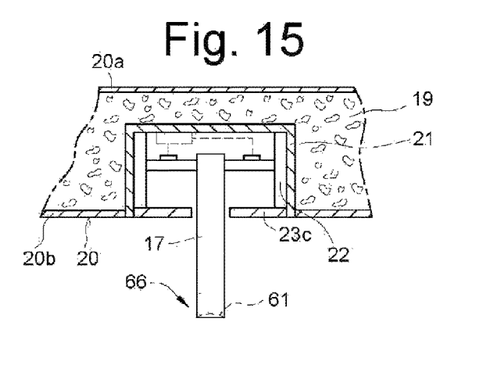
Figure 16:
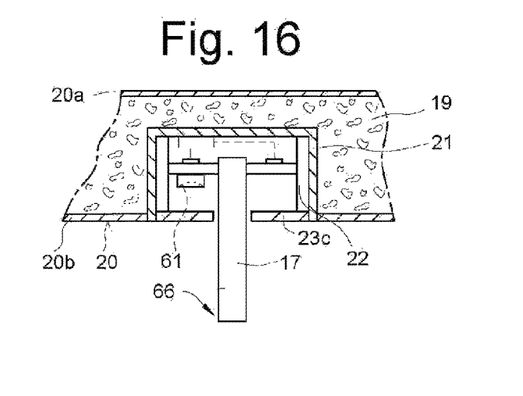

The membrane 61 can be for example positioned at the free end 66 of the pin 17 (see FIG. 15) or can be positioned within the housing 69.

The membrane 61 can be used to obtain buoyant information by sensing pressure or by sensing changes in pressure.

Instead of a membrane 61 any other pressure sensitive sensor or detector can be employed which might generate for the system 72 information about a relative direction of the object 10 relative to the fluid 12 in z-direction.

The invention claimed is:

1. An apparatus for sensing movement of a moving object moving relative to a fluid, the apparatus comprising:
 a housing fixed relative to and having a cover flush with a fluid-engaging surface of the moving object and not projecting from the fluid-engaging surface into the fluid;
 a spring held in the housing inward of a surface of the housing and having a plurality of elastically deformable blades together defining a plane substantially parallel to the fluid-engaging surface and each having an outer end fixed to the housing and an inner end;
 a hub connected to the inner ends of the blades of the spring;
 respective strain gauges on the blades; and
 a rigid pin mounted on the hub of the spring, extending perpendicular to the plane through the cover, and projecting from the fluid-engaging surface of the moving object into the fluid such that a transverse force exerted by the fluid on the pin deflects the pin and thereby deforms the blades and the strain gauges and measurably affects an electrical property of the strain gauges.

2. The apparatus according to claim 1, wherein there are at least three of the blades.

3. The apparatus according to claim 1, wherein the blades are angularly equispaced from each other about an axis of the pin.

4. The apparatus according to claim 1, wherein there is a respective one of the strain gauges on each of the blades.

5. The apparatus according to claim 1, further comprising:
 a float carried on the pin.

6. The apparatus according to claim 1, wherein the housing comprises a cover flush with the fluid-engaging surface of the moving object.

7. The apparatus according to claim 6, wherein the cover has a bore having an inner diameter larger than an outer diameter of the pin and the pin extends through the bore.

8. The apparatus according to claim 1, wherein the spring urges the pin into a rest position when no forces from the fluid act upon the pin.

9. A system for determining information about movement of a moving object relative to a fluid, the system comprising:
 an apparatus according to claim 1,
 a first communication unit on the moving object and connected to the apparatus, and
 a second communication unit remote from the moving object and receiving information from the first communication unit.

10. The system according to claim 9, further comprising:
 a calculating unit configured to calculate from information received from the first unit a velocity of the moving object and a direction of movement of the moving object relative to the fluid.

11. The system according to claim 10, wherein the calculating unit uses GPS-information about the moving object for calculating a velocity of the moving object and a direction of movement of the moving object relative to the fluid.

* * * * *